United States Patent [19]

Everard

[11] Patent Number: 4,688,812

[45] Date of Patent: Aug. 25, 1987

[54] WHEELED ARRANGEMENT

[75] Inventor: Daniel H. S. Everard, Gt. Shelford, England

[73] Assignee: Everaids Limited, Bournemouth, England

[21] Appl. No.: 902,219

[22] Filed: Oct. 20, 1986

Related U.S. Application Data

[63] Continuation of Ser. No. 714,558, Mar. 21, 1985, abandoned.

[30] Foreign Application Priority Data

Mar. 29, 1984 [GB] United Kingdom ................ 8408109

[51] Int. Cl.$^4$ ............................................. B62B 11/00
[52] U.S. Cl. .................................... 280/5.2; 180/65.1; 280/242 WC
[58] Field of Search ...................... 180/65.1, 8.2, 907; 280/5.2, 5.28, 111, 113, 117, 86, 242 WC

[56] References Cited

FOREIGN PATENT DOCUMENTS

| 872441 | 4/1953 | Fed. Rep. of Germany ...... 280/111 |
| 2731952 | 1/1978 | Fed. Rep. of Germany ...... 280/242 WC |
| 2043554 | 10/1980 | United Kingdom ................ 180/907 |
| 1582469 | 1/1981 | United Kingdom ........ 280/242 WC |

Primary Examiner—John J. Love
Assistant Examiner—Michael Mar
Attorney, Agent, or Firm—Lee, Smith & Zickert

[57] ABSTRACT

A wheeled arrangement, particularly a wheeled vehicle such as a wheelchair, includes two wheels (12,14) mechanically interconnected by a linkage including an inclined pivot (16) such that when forward movement of one wheel is obstructed continued forward movement of the arrangement and of the other wheel causes the one wheel to lift relative to the other wheel by rotation on the inclined pivot. Such an arrangement is capable of climbing a step or other obstacle having a greater height in relation to the diameter of the wheels than is possible with conventional arrangements.

11 Claims, 4 Drawing Figures

WHEELED ARRANGEMENT

This application is a continuation of U.S. patent application Ser. No. 714,558, filed Mar. 21, 1985, and now abandoned.

FIELD OF INVENTION

This invention relates to a wheeled arrangement, particularly a wheeled vehicle such as a wheelchair.

BACKGROUND OF THE INVENTION

Known wheeled arrangements, eg conventional wheelchairs, generally encounter difficulties in climbing obstacles such as steps, curbs etc. This is because a wheel is generally only able to climb a step with a height of at most ¼ to ⅓ the diameter of the wheel, the actual step height climbable also depending on other factors such as the magnitude of the driving force applied. Wheelchairs typically have a pair of small wheels, so their climbing capabilities are generally fairly limited, restricting the terrain and circumstances in which they can be used.

THE INVENTION

According to one aspect of the present invention there is provided a wheeled arrangement comprising two wheels mechanically interconnected by a linkage including an inclined pivot such that when forward movement of one wheel is obstructed continued forward movement of the arrangement and of the other wheel causes said one wheel to lift relative to said other wheel by rotation on the inclined pivot.

The expression "inclined pivot" is used to mean that when the arrangement is located on a planar surface the pivot is inclined at an angle of other than 90° to the surface.

An arrangement in accordance with the invention is capable of climbing a step having a height greater in relation to the diameter of the wheels than is possible with conventional arrangements, and may be capable of climbing a step having a height greater than the diameter of the wheels. In order to achieve such climbing capabilities the arrangement is used in the following manner.

The arrangement must approach an obstacle such as a step at an angle so that one of the wheels encounters the obstacle before the other. When the first wheel encounters the obstacle continued forward movement of the arrangement causes that wheel to lift relative to the other wheel by rotation on the inclined pivot, and provided adequate clearances are available and adequate driving force is applied the first wheel can lift by a sufficient amount to clear the obstacle. Meantime, the other wheel has continued forward movement on the lower level and when the other wheel encounters the obstacle rotation about the inclined pivot in the opposite sense will raise the other wheel to clear the obstacle. It will be apparent that it is necessary to approach an obstacle at an appropriate angle depending on the height of the obstacle, with a greater deviation from a normal approach being required the higher the obstacle to be cleared.

The arrangement conveniently comprises a further set eg pair of wheels, preferably of greater diameter so they can easily clear obstacles. Such further wheels may be powered, eg by an electric motor carried by the arrangement.

The invention is generally applicable to wheeled vehicles, and finds particular application in wheelchairs, eg having a pair of larger diameter powered wheels.

For the arrangement to function in the manner described above the pivot must be inclined so that the top of the pivot is located forward of the bottom of the pivot with respect to the normal direction of motion of the arrangement. This means that the interconnected wheels can be located either fore or aft of the arrangement, with the pivot being inclined in an appropriate direction.

The interconnected wheels are preferably castor wheels.

In one simple embodiment the wheels are both mounted on a common axle or transom, the centre of which is pivotally connected to a framework for pivoting movement about an inclined axis. Other more complex arrangements can also be envisaged.

The angle of inclination of the pivot may be selected to give good performance for any particular arrangement, and will generally preferably be in the range 15° to 75°. The optimum angle for any particular arrangement will depend on factors including the weight of the arrangement and of any load to be carried thereby and the magnitude of driving force to be used. For use on a childs wheelchair, an angle of inclination of about 45° has been found to give good results.

In a preferred aspect the present invention provides a wheelchair comprising two similar rear wheels mechanically interconnected by a linkage including an inclined pivot such that when forwards movement of one wheel is obstructed continued forwards movement of the arrangement and of the other wheel causes said one wheel to lift relative to said other wheel by rotation on the inclined pivot, and two similar larger diameter front wheels.

The invention will be further described, by way of example, with reference to the accompanying drawings.

IN THE DRAWINGS

DETAILED DESCRIPTION OF THE DRAWINGS

Figure 1:
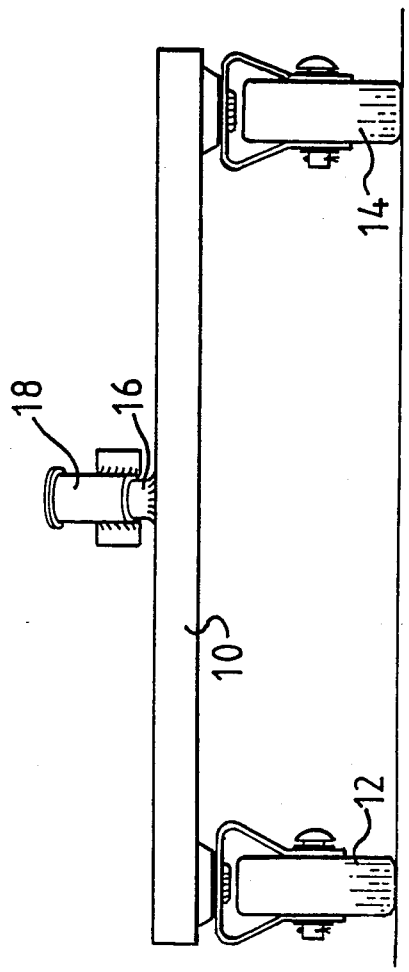
FIG. 1 is a side view of part of an arrangement in accordance with the present invention.
Figure 2:
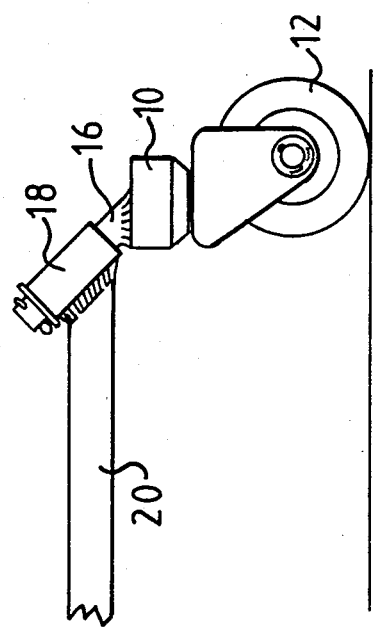
FIG. 2 is a rear view of the arrangement of FIG. 1.

FIGS. 1 and 2 illustrate an arrangement in accordance with the present invention, comprising a rear transom or axle 10 carrying a pair of similar castor wheels 12,14, one at each end. An inclined bar 16 is rigidly connected to the center of transom 10, and is received within a similarly inclined tubular sleeve 18 for pivoting movement. Sleeve 18 is secured to a framework 20, only part of which is shown, which leads to further components (not shown). The arrangement will generally include a further pair of similar, larger diameter wheels, possibly driven wheels, at the front end of the arrangement. As shown, bar 16 and sleeve 18 are inclined at an angle of about 45° to the ground when the arrangement is located on a planar surface.

Figure 3:
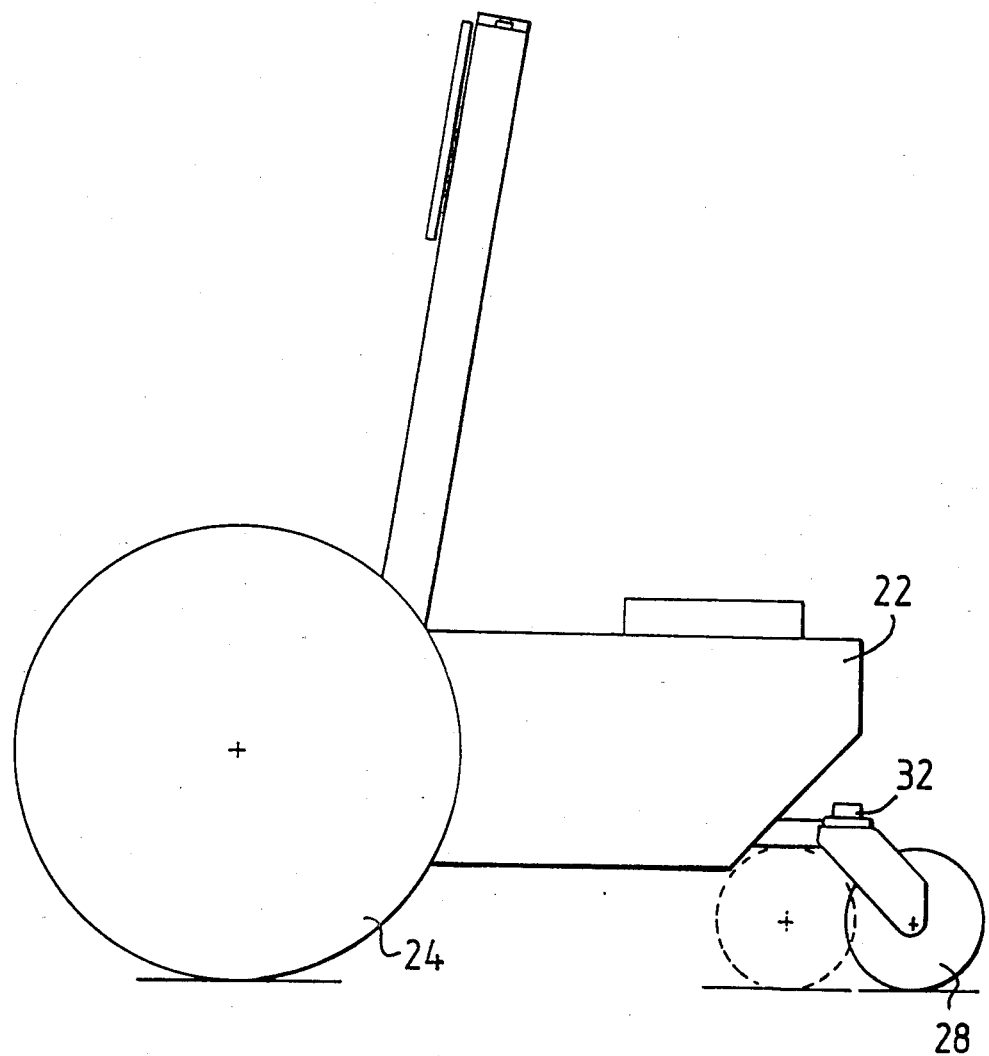
FIG. 3 is a side view of a wheelchair chassis incorporating an arrangement in accordance with the invention.
Figure 4:
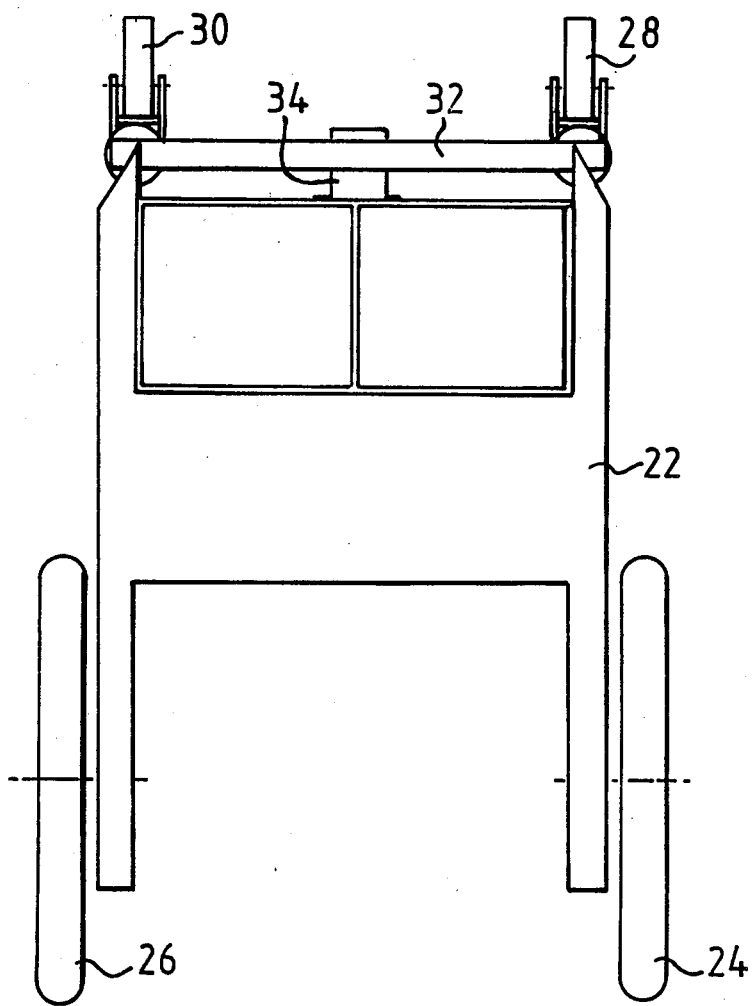
FIG. 4 is a plan view of the wheelchair chassis of FIG. 3, with parts omitted for clarity.

Such an arrangement may conveniently be incorporated in a wheelchair, for example as in the embodiment of FIGS. 3 and 4. These Figures illustrate the chassis of a childs wheelchair comprising a framework/housing 22 supported by a pair of similar, relatively large diameter front wheels 24,26 which are driven by an electric motor (not shown) located inside the housing. At its rear the wheelchair includes a climbing arrangement generally similar to that of FIGS. 1 and 2 and comprising a pair of similar, relatively small diameter castor wheels 28,30 mounted one at each end of rear transom 32. Transom 32 is mounted for pivoting movement about a pivot 34 (not visible in FIG. 3) secured relative to framework/housing 22, pivot 34 being inclined at an angle of about 45° to the ground when the wheelchair is located on a planar surface.

The wheelchair may climb steps and other obstacles by use in the manner described above, by approaching an obstacle at an angle. The front wheels can clear obstacles relatively easily because of their large diameter, and continued forwards movement of the wheelchair will cause one of the rear wheels, say wheel 28, then to encounter the obstacle. On continued forward movement of the wheelchair under the driving action of the motor the other rear wheel 30 moves forward and the transom 32 pivots about pivot 34 causing upwards movement of wheel 28. Provided sufficient clearance is available and provided the driving force is sufficient the wheel 28 will be raised to a sufficient extent to clear the obstacle. When wheel 30 subsequently encounters the obstacle, pivoting of the transom in the opposite sense will raise that wheel also to clear the obstacle.

The illustrated embodiment of wheelchair has approximate dimensions as follows:

Overall length of wheelbase: 630 mm
Spacing between castor centres: 400 mm
Diameter of front wheels: 350 mm or 400 mm
Diameter of castors: 100 mm or 125 mm Using castors of 100 mm diameter it has been found that the wheelchair is capable of climbing steps at least 100 mm high, the step height climbable generally being limited by available clearances for movement of the linkage and the available power rather than by functioning of the climbing mechanism itself.

I claim:

1. A wheeled arrangemenet for supporting a wheeled vehicle comprising two caster wheel assemblies and a linkage mechanically interconnecting the wheel assemblies with the two wheel assemblies being rigidly fixed relative to each other by means of the linkage, the linkage including a pivot assembly having a top position secured to the wheeled vehicle and a bottom portion secured to said linkage, said pivot assembly being inclined so that the top portion of the pivot assembly is located forwardly of the bottom portion of the pivot assembly with respect to the normal direction of motion of the wheeled arrangement, the arrangement being such that when one of said wheel assemblies engages an obstruction while moving in a forward direction, continued forward movement of said one wheel assembly over the obstruction causes said one wheel assembly to lift relative to the other wheel assembly by rotation of the linkage about the inclined pivot assembly and resulting in forward movement of said other wheel assembly relative to the wheeled arrangement and thereby enabling said one wheel assembly to rise over the obstruction.

2. An arrangement according to claim 1, comprising a further set of wheels.

3. An arrangement according to claim 2, comprising a further pair of wheels.

4. An arrangement according to claim 2, wherein the further wheels are of larger diameter than the interconnected wheels.

5. An arrangement according to claim 2, wherein the further wheels are powered.

6. An arrangement according to claim 5, further comprising an electric motor carried by the arrangement for driving the further wheels.

7. An arrangement according to claim 1, comprising an transom on which both of the interconnected wheels are mounted, and a framework to which the centre of the transom is pivotally connected by said inclined pivot for pivoting movement about an inclined axis.

8. An arrangement according to claim 1, wherein the angle of inclination of the pivot is in the range of 15° to 75°.

9. An arrangement according to claim 8, wherein the angle of inclination of the pivot is about 45°.

10. A wheelchair comprising two similar smaller diameter caster wheel assemblies, one at each side of the wheelchair, two similar larger diameter wheels, one at each side of the wheelchair, and a linkage mechanically inerconnecting the smaller diameter wheel assemblies, with the two smaller diameter wheel assemblies being rigidly fixed relative to each other by means of the linkage, the linkage including a pivot assembly having a top portion secured to the wheelchair and a bottom portion secured to said linkage, said pivot assembly being inclined so that the top portion of the pivot assembly is located forwardly of the bottom portion of the pivot assembly with respect to the normal direction of travel of the wheel chair, the arrangement being such that when one of said smaller diameter wheel assemblies engages an obstruction while moving in a forward direction, continued forward movement of said one smaller diameter wheel assembly over the obstruction causes said one smaller diameter wheel assembly to lift relative to the other smaller diameter wheel assembly by rotation of the linkage about the inclined pivot assembly resulting in forward movement of said other smaller diameter wheel assembly relative to said thereby enabling said one wheel assembly to rise over the obstruction.

11. A wheelchair according to claim 10, wherein the smaller diameter wheels are at the rear of the wheelchair and the larger diameter wheels are at the front of the wheelchair.

* * * * *